United States Patent Office 3,755,576
Patented Aug. 28, 1973

3,755,576
ANTI-INFLAMMATORY COMPOSITIONS CONTAINING DIOXYPYRAZOLIDINE DERIVATIVES AND METHODS OF USE
Antonio Esteve, Barcelona, Spain, assignor to Laboratorios Del Dr. Esteve S.A.
No Drawing. Continuation-in-part of abandoned application Ser. No. 777,203, Nov. 19, 1968. This application Mar. 17, 1971, Ser. No. 125,324
Claims priority, application Spain, Nov. 23, 1967, 347,942
Int. Cl. A61k 17/16, 27/00
U.S. Cl. 424—240
14 Claims

ABSTRACT OF THE DISCLOSURE

Novel para-halogeno benzoates, in particular the para-chlorobenzoate of 1,2-diphenyl-4-n-butyl-4-hydroxymethyl-3,5-dioxopyrazolidine have been prepared. These have therapeutic properties which make them suitable for the treatment of disorders which are accompanied by inflammation, such as acute, subacute and chronic rheumatismal disorders.

---

This application is a continuation-in-part of copending application Ser. No. 777,203, filed Nov. 19, 1968 now abandoned.

This invention relates to p-halogeno benzoates and in particular to p-halogeno benzoates of a substituted dioxopyrazolidine, which have valuable antiphlogistic, analgesic and antipyretic properties.

Three kinds of substances are mainly used in the treatment of diseases which are usually accompanied by painful inflammation. These are derivatives of acetylsalicylic acid, indometacines and phenylbutazones. Although many other pharmaceutical products may be used in conjunction with these compounds, these compounds are not normally used as the principal therapeutic agent.

Over a period of years, phenylbutazone has acquired a justified reputation and it is now regarded as the most important antiphlogistic agent. It is now used as a reference standard when evaluating the therapeutic effect of the many new products reported in the literature. Of course, this does not mean to say that the properties of phenylbutazone cannot be bettered. It is simply that practitioners who have been accustomed to using it for so long, have adopted the habit of measuring the activity of any substance submitted to them for this type of treatment against the performance of this particular compound.

The present invention provides p-halogeno benzoates of the following formula

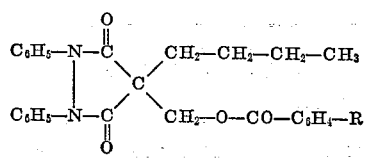

(I)

in which R represents a halogen atom.

Of the compounds which are represented by the general Formula I the para-chlorinated compounds have been found to be particularly valuable, in particular the parachlorobenzoic ester of 1,2-diphenyl-4-n-butyl-4-hydroxymethyl-3, 5-dioxopyrazolidine, herein referred to as AE–9, represented by the Formula II below, which can be obtained as colourless prismatic crystals or as a white powder insoluble in water:

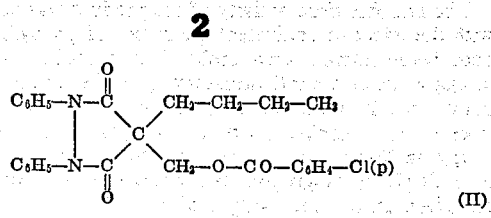

(II)

The compounds corresponding to general Formula II are prepared by first forming a 4-hydroxymethyl derivative of 1,2-diphenyl-4-n-butyl-3,5-dioxopyrazolidine, followed by esterification with the corresponding acid chloride of the halogeno benzoic acid. Preferably, the compound is prepared as follows:

(a) Preparation of 1,2-diphenyl-4-n-butyl-3-hydroxymethyl-3,5-dioxopyrazolidine 308 g. (1 mole) of 1,2-diphenyl-4-n-butyl-3,5-dioxopyrazolidine are refluxed during 2 hours in a mixture of 900 ml. absolute ethanol and 100 ml. of a solution of formol 40% in water. The mixture is allowed to cool overnight in a refrigerator and after filtration, washing with alcohol and drying, crystals (305 g.) are obtained. Melting point: 146–147° C., yield 90%.

(b) Preparation of para-chlorobenzoic ester of 1,2 - diphenyl-4-n-butyl-4-hydroxymethyl-3,5-dioxopyrazolidine In a 2 liter 3-necked flask fitted with mechanical stirrer, dropping funnel and entry for nitrogen circulation, 338 g. (1 mole) of the hydromethyl derivative of phenylbutazone prepared according to step (a) are added. The resultant mixture is dissolved in a mixture of 200 ml. pyridine and 600 ml. dimethylformamide. When the temperature reaches 0° C. by means of a salt ice bath, 175 g. (1 mole) of p-chlorobenzyl chloride previously subjected to a mild nitrogen flow are added dropwise under stirring.

Once the addition of all the amount of the acid chloride is completed, the material is maintained under stirring during one hour and is then allowed to stand during 24 hours in a refrigerator and finally 24 hours at room temperature. The temperature is then raised to 30–40° C. to dissolve the precipitate which occurred. The mixture is then cooled and poured in ice-water containing hydrogen chloride (1:1). Stand 24 hours, filter and wash several times with water and once with cold alcohol.

Following two recrystallisations from alcohol, there are obtained 380 g. of perfect prismatic crystals melting at 90–91° C. Esterification yield: 80%.

The possibility of obtaining an even better effect by using the product in conjunction with other substances that produce a synergistic effect was also considered. It was thought that this might allow much smaller doses of each of the products to be used. Prednisone has been used in this way with AE–9 although other corticosteriods with similar properties such as cortisone or prednisolone produce the same effects when used in therapeutically equivalent doses. The combination of AE–9 with prednisone was studied orally and was found to give very good results.

Acute toxicity of AE–9

This substance has better properties than phenylbutazone. In particular, it has a very much lower toxicity level than phenylbutazone which, in view of its activity, provides it with a very favourable therapeutic index. Its acute toxicity as investigated in mice by oral administration of 1 and 2 g. doses per kg. of body weight, does not produce any deaths. When administered in doses of 4 g./kg. it produces only one death in 10 mice. With rats, too, a dose in excess of 4 g./kg. was administered without reaching 50% mortality. Accordingly, the $DL_{50}$ is above 4 g./kg. in both cases. The low toxicity of this product is obvious when compared with the $DL_{50}$ of phenylbutazone which is 1 g./kg.

Pharmacological activity of AE-9

The antiphlogistic activity of the product was compared with the effect of equivalent quantities of phenylbutazone both being administered orally. Using kaolin, carrageen or egg white as the inflammatory agent, better anti-inflammatory results were obtained with the para-chlorobenzoic ester of 1,2 - diphenyl-4-n-butyl-4-hydroxymethyl-3,5-dioxypyrazolidine than with phenylbutazone using Hillebrecht's plethysmographic method, the results from which are given in the following table:

ANTI-INFLAMMATORY ACTIVITY, EXPRESSED IN PERCENT

[Inflammatory agent: 15% egg albumin]

| Time in minutes | Dose of phenylbutazone | | Dose of AE-9 | |
| --- | --- | --- | --- | --- |
| | 25 mg./kg. | 50 mg./kg. | 25 mg./kg. | 50 mg./kg. |
| 30 | 20 | 30 | 25 | 32 |
| 90 | 18 | 28 | 31 | 41 |
| 150 | 36 | 35 | 34 | 46 |

These results show quite clearly that AE-9 has a higher anti-inflammatory activity than phenylbutazone. This improvement in activity may be assessed as approximately 30% which gives a much higher therapeutic index than phenylbutazone because of the lower toxicity.

Tests were conducted with this substance in several clinical cases which show that AE-9 is very valuable because of the reproducibility of the favourable results obtained, the absence of secondary reactions, and the lack of rejection in all the cases treated.

Acute toxicity of AE-9 and prednisone mixtures in mice

Tests: Acute toxicity was determined in albino mice weighing between 18 and 22 g. Groups each comprising 10 mice were used. The substances were orally administered. In each case the dose administered was 0.5 ml. per 20 g. The dispersions were prepared using a 2% gum arabic solution.

Results: Mortality was observed 72 hours after administration:

AE-9—2000 mg./kg.—0/10
* prednisone—60 mg./kg.
AE-9—2000 mg./kg.—0/10
* prednisone—200 mg./kg.
AE-9—2000 mg./kg.—0/10
* prednisone—400 mg./kg.

Antiphlogistic activity of AE-9 and prednisone

Tests: The tests were conducted on Wistar rats weighing between 100 and 150 g. without any distinction between sexes. Inflammation of the paw was caused by the subplantal injection of 0.05 ml. of a 10% kaolin solution. The tests were carried out on three groups of rats: a first group which were treated with phenylbutazone and a prednisone: a second group treated with AE-9 and prednisone and a third group which were not given any anti-inflammatory treatment, being used as a control. The volume of the paws was measured using a plethylsmograph similar to that of Hillebrecht's.

Results: The results obtained are given in the following table. The figures shown represent the averages of the figures obtained in the tests. They are expressed in percent of the inflammation inhibited relative to the control group

| Time elapsing after injection of kaolin— | Phenylbutazone, 50 mg./kg. plus prednisone, 1.5 mg./kg. | AE-9, 50 mg./kg. plus prednisone, 1.5 mg./kg. |
| --- | --- | --- |
| 5 hours | 54 Percent | 56 Percent |
| 24 hours | 40 Percent | 55 Percent |
| 48 hours | 35 Percent | 48 Percent |

Pharmaceutical forms: The methods recommended for administering the product itself or when used with corticosteroids, are in the forms normally used for this category of medicaments, i.e., oral preparations including dragées, tablets or capsules and rectal preparations including suppositories. The following examples illustrate the preparation of dragées and of suppositories.

EXAMPLE 1

Preparation of dragées

A mixture of the ingredients is prepared in accordance with the proportions specified for the dragée:

| | G. |
| --- | --- |
| AE-9 | 0.200 |
| Aerosil compositum | 0.005 |
| Rice starch | 0.013 |
| Carboxymethyl cellulose | 0.010 |
| Sodium lauryl sulphate | 0.002 |
| Magnesium stearate | 0.004 |

After the mixture has been prepared, it is size-reduced and suitably compressed, the tablets thus obtained being converted into dragées by coating them with successive layers of sugar by the usual methods. The dragées thus obtained weigh from 0.355 to 0.360 g. Treatment comprises administering from 2 to 6 dragées per day.

EXAMPLE 2

Preparation of "suppositories"

The suppository form is prepared in the usual way by incorporating the active ingredient sufficient excipient, such as cocoa butter, mixtures of fatty acid esters, hydrogenated fat or any other substance normally used for this pharmaceutical form. In a preferred formulation, the preparation is made using the following proportions:

AE-9—0.500 g.

Monolene—qsf. for a suppository weighing from 2.5 to 3 g.

The recommended dose is from 1 to 2 suppositories per day.

EXAMPLE 3

Preparation of the AE-9 and prednisone compositions

"Dragée" form: A mixture of the following ingredients is prepared in the proportion corresponding to the figures given above for a dragée:

| | G. |
| --- | --- |
| AE-9 | 0.100 |
| Prednisone | 0.003 |
| Aerosil compositum | 0.005 |
| Rice starch | 0.085 |
| Carboxymethyl cellulose | 0.010 |
| Sodium lauryl sulphate | 0.002 |
| Magnesium stearate | 0.004 |

The method of preparation is identical in every respect to that given in Example 1.

"Suppository" form: The suppositories are prepared by the method described in respect to the AE-9 suppositories, for example:

| | G. |
| --- | --- |
| AE-9 | 0.200 |
| Prednisone | 0.005 |

Fat-based excipient qsf. 1 suppository.

What is claimed is:

1. A pharmaceutical composition comprising about 0.1 to 0.5 gm. of a para-chloro benzoate of the formula:

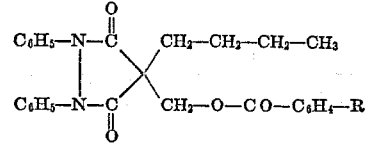

wherein R is a chlorine atom and a pharmaceutical carrier.

2. The composition of claim 1 when presented in a form suitable for oral or rectal administration.

3. The composition of claim 1 when presented in the form of a dragée or suppository.

4. The composition of claim 1 when presented in the form of a dragée containing about 0.1 to 0.2 gm. of said para-chloro benzoate.

5. The composition of claim 1 when presented in the form of a suppository containing about 0.2 to 0.5 of said para-chloro benzoate.

6. A pharmaceutical composition comprising about 0.1 to 0.5 gm. of chlorobenzoate of the formula:

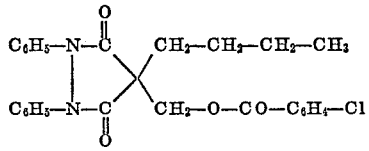

in admixture with an anti-inflammatory corticosteroid.

7. The composition of claim 6 wherein said corticosteroid is selected from the group consisting of prednisone, cortisone and prednisolone.

8. The composition of claim 6 wherein said corticosteroid is prednisone and presented as a dragée.

9. The composition of claim 6 wherein said corticosteroid is prednisone and presented as a suppository.

10. The composition of claim 6 wherein said corticosteroid is prednisone when presented as a dragée containing about 50 to 150 mg. of said para-chlorobenzoate and about 3 to 6 mg. of prednisone.

11. A method for obtaining anti-inflammatory, analgesic and antipyretic effects which comprises administration of an effective amount in the range between about 0.1 and 0.5 gm., of a para-chloro benzoate of the formula:

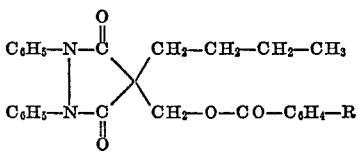

wherein R is a chlorine atom.

12. The method of claim 11 wherein administration is effected orally.

13. The method of claim 11 wherein administration is effected rectally.

14. The method of claim 11 wherein a corticosteroid selected from the group consisting of prednisone, cortisone, and prednisolone is also administered.

References Cited

Esteve: Chem. Abst., vol. 72 (1970), p. 24648e.
Esteve: Chem. Abst., vol. 71 (1969), p. 49939t.

SAM ROSEN, Primary Examiner

U.S. Cl. X.R.
424—273